(12) United States Patent
Petersson et al.

(10) Patent No.: US 8,934,942 B2
(45) Date of Patent: Jan. 13, 2015

(54) BASE STATION ARRANGEMENTS USING A PLURALITY OF ANTENNA ELEMENTS WITH DIFFERENT POLARIZATIONS

(75) Inventors: Sven Petersson, Savedalen (SE); Bjorn Johannisson, Kungsbacka (SE)

(73) Assignee: Telefonaktiebolaget L.M. Ericsson (publ), Stockholm (SE)

(*) Notice: Subject to any disclaimer, the term of this patent is extended or adjusted under 35 U.S.C. 154(b) by 445 days.

(21) Appl. No.: 13/376,437

(22) PCT Filed: Jun. 8, 2009

(86) PCT No.: PCT/EP2009/057046
§ 371 (c)(1),
(2), (4) Date: Dec. 6, 2011

(87) PCT Pub. No.: WO2010/142319
PCT Pub. Date: Dec. 16, 2010

(65) Prior Publication Data
US 2012/0088537 A1 Apr. 12, 2012

(51) Int. Cl.
*H04B 7/06* (2006.01)
*H04B 7/08* (2006.01)
*H04W 52/42* (2009.01)

(52) U.S. Cl.
CPC ............ *H04B 7/0626* (2013.01); *H04B 7/0632* (2013.01); *H04W 52/42* (2013.01)
USPC ..................... 455/562.1; 455/272; 455/276.1; 455/279.1

(58) Field of Classification Search
CPC .. H04B 7/0626; H04B 7/0632; H04B 7/0602; H04B 7/04; H04B 7/0408; H04B 7/0426; H04B 7/043; H04B 7/0469; H04B 7/0619; H04B 7/0634; H04B 52/42
See application file for complete search history.

(56) References Cited

U.S. PATENT DOCUMENTS

2006/0166626 A1* 7/2006 Luo et al. ...................... 455/101
2007/0171811 A1 7/2007 Lee et al.

FOREIGN PATENT DOCUMENTS

EP    1315311 A1 *  5/2003    ............... H04B 7/02

OTHER PUBLICATIONS

Kim, et al., "Mode Selection Between Antenna Grouping and Beamforming for MIMO Communication Systems", Information Sciences and Systems, Mar. 18, 2009, pp. 506-511, XP031468656.
Layec, et al., "Sum Discrete-Rate Maximization with Rate and Power Control in Layered Space-Time Coding," IEEE Transactions on Communications, Mar. 1, 2009, pp. 789-800, XP011267743.

* cited by examiner

*Primary Examiner* — Philip Sobutka
(74) *Attorney, Agent, or Firm* — Rothwell, Figg, Ernst & Manbeck, P.C.

(57) ABSTRACT

Base station arrangement (100) adapted to receive signals from a user station; adapted to be connected to or comprises a plurality of antenna elements (1, 1, 2, 2, . . . 4,) with antenna ports (11, . . . 11) and a signal processing unit (20). The base station (21) also comprises a signal pre-processing functional unit (30) to collect channel correlation information. It is adapted to establish if there is one or more distinguishing characteristics comprising different correlation properties of different configuration properties associated with the antenna elements. Antenna elements are then assigned to different groups based on said configuration properties, and the channel correlation information is used to generate weighting information which is applied to antenna ports connected to antenna elements to control the antenna ports connected to antenna elements to control the antenna element transmit power individually or groupwise.

15 Claims, 12 Drawing Sheets

US 8,934,942 B2

BASE STATION ARRANGEMENTS USING A PLURALITY OF ANTENNA ELEMENTS WITH DIFFERENT POLARIZATIONS

CROSS REFERENCE TO RELATED APPLICATION(S)

This application is a 35 U.S.C. §371 National Phase Entry Application from PCT/EP2009/057046, filed Jun. 8, 2009, designating the United States, the disclosure of which is incorporated by reference herein in its entirety.

TECHNICAL FIELD

The present invention relates to a base station arrangement, adapted to be connected to, or comprising, an antenna part with a plurality of antenna elements. It comprises a signal processing unit to which antenna ports of the antenna part are connected. The invention also relates to a method for, in such a base station arrangement, enabling control of downlink multipath transmission to a user station over the multiple ports.

BACKGROUND

For mobile communications systems multipath downlink transmission has received a lot of attention and many efforts have been done to enable an efficient handling of power in the base station, also with the aim of enabling a good receiving possibility in the user station. Since multiple antennas are used, signals on the respective antennas have to be transmitted with an appropriate power, which normally is handled by applying so called downlink weight vectors.

Different approaches have been implemented which all are based on utilizing different types of data for determining the downlink weight vector.

According to one method received uplink power spectra are used to estimate direction of arrival (DOA) for the signals. Such a method can be applied also when one can not rely on channel reciprocity and transmission instead is based on second order statistics. If, on the other hand, channel reciprocity is applicable, it is possible to calculate eigenvectors for a channel correlation matrix and then to use these eigenvectors for downlink transmission. The weight vector is based on a channel estimation for received signals and contains phase and amplitude information. Through the use of an eigenvector based approach, the antenna configuration does not have to be known in order to implement the channel estimation algorithm, which is an advantage compared to methods based on estimating direction of arrival. There are however problems associated with all known methods. Two of these problems are that power utilization in a base station can not be controlled to a satisfactory extent and that power is not optimzed.

Methods based on eigenvalue decomposition of the estimated channel correlation matrix information use eigenvalues and eigenvectors. The eigenvalues are measures of the channel quality and the eigenvectors are the weightvectors to be used. For some antenna arrangements an eigenvector can be interpreted as a conventional beam-forming vector. FIG. 1 for example shows a radio base station RBS $20_0$ with (here) four antenna elements having the same polarization connected thereto over antenna ports, on the antenna part, and feeder ports, which are the ports of the RBS (Radio Base Station).

The antenna part may e.g. comprise a uniform linear array (ULA) with four antenna elements, with an element spacing dr in the base station. It here communicates with a single antenna in a user equipment UE $9_0$. The antenna elements are located so close to each other, typically half a wavelength, that the radio channel between the antenna in UE $9_0$ and the ULA in RBS $20_0$ in many cases are highly correlated. This means that they are almost identical for all base station antenna elements, except for a direction of arrival dependant phase shift corresponding to the difference in path length in communication with the UE. The signal received in RBS $20_0$ can, for a radio channel with a small angular spread, i.e., for highly correlated radio channels between the UE antenna and base station antennas be expressed as:

$$y = (a(\phi)c)x + n = hx + n,$$

wherein $a(\phi)$ is the array response vector, and $\phi$ is a spatial angle corresponding to the direction of arrival of the signal.

$$a(\phi) = [e^{j(-(N-1)/2kd\,\sin(\phi))}\ e^{j(-(N-3)/2kd\,\sin(\phi))} \ldots e^{j((N-1)/2kd\,\sin(\phi))}]^T$$

The total radio channel h, which is estimated from the received signal vector, is composed by the array response vector and a complex channel amplification c which is assumed to be identical for all antenna elements, the transmitted signal is denoted x and interference including thermal noise is denoted n. The covariance matrix for the (total) radio channel is found to be:

$$R_{h,h} = E\{hh^H\} = a(\phi)cc^H a(\phi)^H + R_{n,n} = cc^H a(\phi)a(\phi)^H + R_{nn}$$

If an eigenvalue decomposition of $R_{h,h}$ is performed, eigenvalues D and eigenvectors V are obtained such that:

$$R_{h,h}V = VD$$

As the channel rank is 1 in this case with only one antenna at the UE, there is only one eigenvalue>0. The eigenvector corresponding to that eigenvalue is a replica of the array response $a(\phi)$ except for a complex scaling factor. Thus, if this vector is applied as a transmit weight vector, a beam pointing in the direction of the UE will result.

Further, in this example all elements in the weight vector will have the same magnitude but this is not the general case. When channel correlation is low, which for example occurs if the antenna is dual polarized or if the element separation is large there will be a magnitude variation over the elements. This is exemplified in FIG. 2 which shows a state of the art arrangement with an antenna part $10'_0$ with dual polarized antenna means, a processing unit $21_0$ which performs an eigenvalue decomposition of channel estimates for finding an eigenvector to be applied for feeding the antenna elements.

If separate power amplifiers separately feed individual branches or antenna element formations, which is a very common implementation, the magnitude variation in the weight vector results in that, since the largest magnitude will limit the output power in order not to overload the power amplifier, the available power resources will not be utilized in an optimal way (unless somehow used by other simultaneous users) and resource usage will be limited Conventionally an eigenvalue decomposition is performed over all elements in the antenna array to find eigenvalues and eigenvectors. The finding of eigenvalues and eigenvectors does not require any information about the architecture of the antenna array, which traditionally has been seen as an advantage. Typically the amplitude varies over the elements in the weight vector (eigenvector) which results in a reduction of the available maximal output power to the concerned UE for common radio architectures.

SUMMARY

It is a general object of the present invention to provide a base station arrangement which allows a better usage of available transmit power resources in the base station arrangement. It is also an object of the invention to provide a base station arrangement through which it becomes possible to control transmit power, to be transmitted via a plurality of antenna elements of an antenna part, such that the available transmit power used on the channels can be more efficiently. It is an object of the invention to provide a base station arrangement through which usage of available transmit power resources can be optimized, for transmission by means of single polarized as well as by means of dual polarized antennas, or antenna parts wherein the antenna elements are arranged at a considerable, or varying, distance from each other, or differ in some other manner.

Therefore a base station arrangement as initially referred to is provided wherein antenna elements of an antenna part are connected by means of antenna ports to the base station arrangement. The base station arrangement comprises a signal processing unit to which the antenna ports are connected, in some embodiments over feeder ports. The signal processing unit is adapted to collect signal information from signals received from the user station on the uplink. The base station arrangement further comprises a signal pre-processing functional unit, which may be a separate processing unit or which may form part of the signal processing unit, and it is adapted to collect channel correlation information and to, using the channel correlation and/or separately provided configuration information, detect or establish if there is one or more distinguishing characteristics, comprising distinguishing correlation properties and/or distinguishing configuration related properties, associated with channels associated with the antenna elements. The processing unit or the signal pre-processing functional unit, which one depends on implementation; they may also comprise a single unit, is adapted to assign antenna elements to different groups based on said distinguishing characteristics. The processing unit is further adapted to use the channel correlation information to generate weighting information and to apply the weighting information to antenna ports to control the corresponding antenna element transmit power and phase individually or groupwise such that the transmit power can be set independently for the different groups. A number of power amplifying units are connected to the signal processing unit.

As referred to above, state of the art decomposition based methods do not use or need information about antenna array architecture. However, it has here been realized that such information often actually is available since it might be needed for other purposes. If for example some signals are to be transmitted not only to a specific user, but over an entire cell, then such a cell covering transmission will depend on the antenna array architecture and it requires knowledge about the architecture. An example where such information is needed for other purposes, is in TD-SCDMA (Time Division—Synchronous Code Division Multiple Access) where a cell covering transmission over four dual polarized columns is achieved by applying a phase taper, possibly also an amplitude taper, over the antenna elements. The architecture of the antenna path is thus known even if the information is not needed for eigenvalue decomposition. According to the present invention it is proposed to further exploit such information. However, also in cases where such information is not collected or directly available, since it is needed for other purposes, it is, according to the present invention, suggested to collect such information.

Through the present invention it becomes possible to utilize power resources for downlink communication to a better, or preferably full, extent by using or acquiring information about the antenna part and in particular about the transmission scheme. A method is also suggested for, in a base station arrangement, connectable to or comprising, an antenna part, and comprising a processing unit, enabling control of downlink transmit power resources for communication with a user station, which is based on using, already available, or collecting, correlation related information to determine if there are any distinguishing characteristic(s) between antenna elements or channels, and if so, assigning such antenna elements, for which the channels are uncorrelated, i.e. have different correlation properties, or have different configuration properties, to different groups. The method further comprises the step of generating, in the processing unit, antenna element or group related weighting information for groupwise or individual feeding of uncorrelated antenna elements, i.e. antenna elements for which the channels are uncorrelated, in the following also referred to as uncorrelated antenna elements for reasons of simplicity, or antenna elements with different configuration properties. The method further comprises application of the weighting information to the antenna (feeder) ports via amplifying means while setting transmit power independently for uncorrelated antenna elements, or for different groups, for transmission to the user station.

The inventive concept is applicable to conventional systems as well as to so called active systems where the radio is built in in the antenna, e.g. then comprising a base station and antenna arrangement.

It is an advantage of the invention that available transmit power resources can be utilized more efficiently than with known methods. It is also an advantage that this can be provided for in an easy and cheap manner.

BRIEF DESCRIPTION OF THE DRAWINGS

The invention will in the following be more thoroughly described, in a non-limiting manner, and with reference to the accompanying drawings, in which.

DETAILED DESCRIPTION

Figure 3:
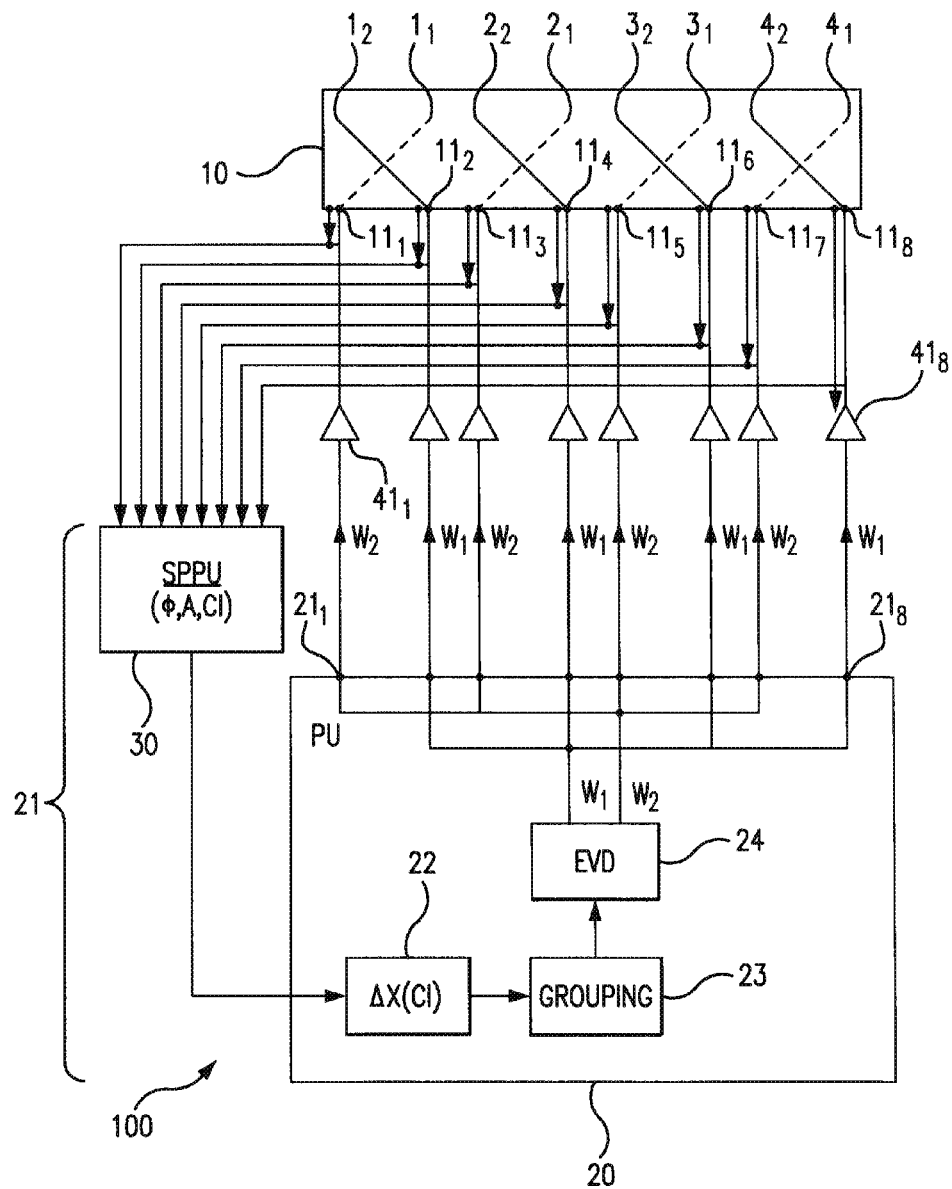
FIG. 3 shows a first embodiment of a base station antenna arrangement, connected to a dual polarized antenna, according to the invention.

FIG. 3 is a block diagram of a base station arrangement 100 of the present invention according to a first implementation. It is connected to an antenna part 10 with a plurality of first antenna elements $1_1, 2_1, 3_1, 4_1$ having a first polarization and a plurality of second antenna elements $1_2, 2_2, 3_2, 4_2$ of another polarization, which is different from said first polarization. The antenna part 10 thus here comprises four, dual polarized antenna means or antennas. Each antenna element has an antenna port $11_1, 11_2, \ldots, 11_8$ which ports here are consecutively numbered for the respective antenna means for reasons of simplicity. The base station arrangement 21 comprises a plurality of antenna ports, here called feeder ports $21_1, \ldots, 21_8$ to which the respective antenna ports are connected by feeder cables. Each feeder port is connected to a respective power amplifying unit $41_1, \ldots, 41_8$. Different kinds of controllable amplifying means can be used, the invention not being limited to any specific kind.

It should be clear that the respective antenna ports and feeder ports (for architectures with active antennas, the radio is built in in the antenna) are used/connected for uplink as well as for downlink communication which is illustrated in a simplified manner, there however being only one communication channel shown between each respective amplifier and feeder port for reasons of clarity. The base station arrangement 21 comprises a signal pre-processing functional unit 30 which in this embodiment is supposed to be a unit which is separate from the processing unit 20. The pre-processing functionality can also be performed by a pre-processing function included in the processing unit 20, c.f. for example FIG. 5, or by the processing unit itself. The signal pre-processing unit (SPPU) 30 collects channel correlation information from uplink channels and, here, detecting means 22 are provided for detecting or establishing the element (or more precisely channel) correlation. The detecting means 22 may be provided in the signal pre-processing unit 30 or in the processing unit, as it is shown in FIG. 3. The processing unit 20 further comprises grouping means 23 adapted to, based on such correlation information, arrange or assign antenna elements into different groups. The grouping means 23 may alternatively be provided in the signal pre-processing unit 30.

The processing unit further comprises a means 24 or a functionality suitable for performing an eigenvalue decomposition. The eigenvalue decomposition is done for all antenna elements in order to enable control of the electrical phase and thus polarization. It should be clear that the eigenvalue decomposition can be done before the grouping in the grouping means or vice versa, i.e. after the grouping. The grouping means 23 are adapted to, based on correlation related information, find elements with a high channel correlation and to group them together. Thus, instead of a conventional eigenvalue decomposition, where the eigenvector to be used for transmission is regarded as a single vector, the elements of the vector are organized into groups, based on the channel element grouping. The elements within each group, or sub-vector, are magnitude normalized within respective group. Since in FIG. 3 the antenna means are dual polarized, i.e. the antenna elements are of two different polarizations, there will be two sub-vectors $w_1, w_2$ to be applied to the antenna elements of either group, here elements from a weight vector $w_1$ is applied to antenna elements $1_2, 2_2, 3_2$ and $4_2$ whereas another weight vector $w_2$ is applied to antenna element $1_1, 2_1, 3_1, 4_1$. The important feature is that the power settings are done independently per group and that it thus becomes possible to maximize the transmit power by setting the power to $P_{max}$, limited by the resource, i.e. power amplified per branch, for the limiting branch per group rather than for the total of all branches.

Figure 1:
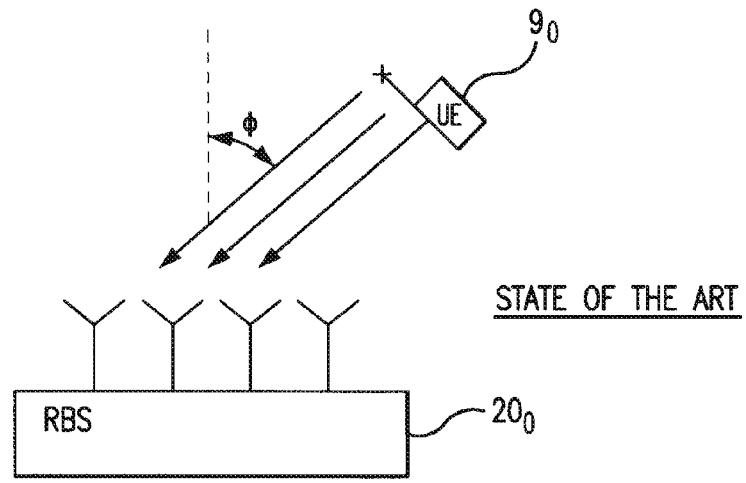
FIG. 1 is a simplified view of a radio base station and antenna arrangement and a mobile station.
Figure 2:
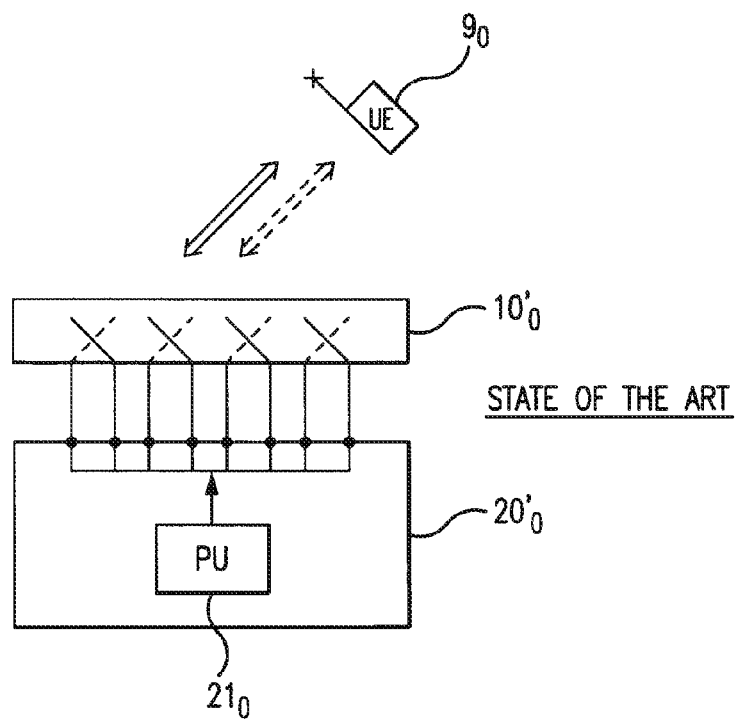
FIG. 2 is an explanatory overview of communication between a radio base station and a user station.

In this embodiment it is supposed that a distinguishing feature is the polarization, detected as different correlation properties. According to the invention it is sufficient to detect that the correlation properties differ, or that channels are uncorrelated, it is not necessary to know why, e.g. if it is due to different polarizations or something else. Within each polarization, a beam will then be directed in the best possible direction, and the received power at the user equipment UE (not shown in this figure, compare for example FIG. 2) is maximized. Thus, according to the invention for the two groups (there might also be more groups with different characteristics), power can be controlled independently for each group. Fundamental is that uplink information, correlation related information, is taken advantage of and used for calculating eigenvectors and also for grouping purposes. It should also be clear that there may be other distinguishing characteristics, known or unknown, and/or that there may be assignment into more than two groups.

Figure 7:
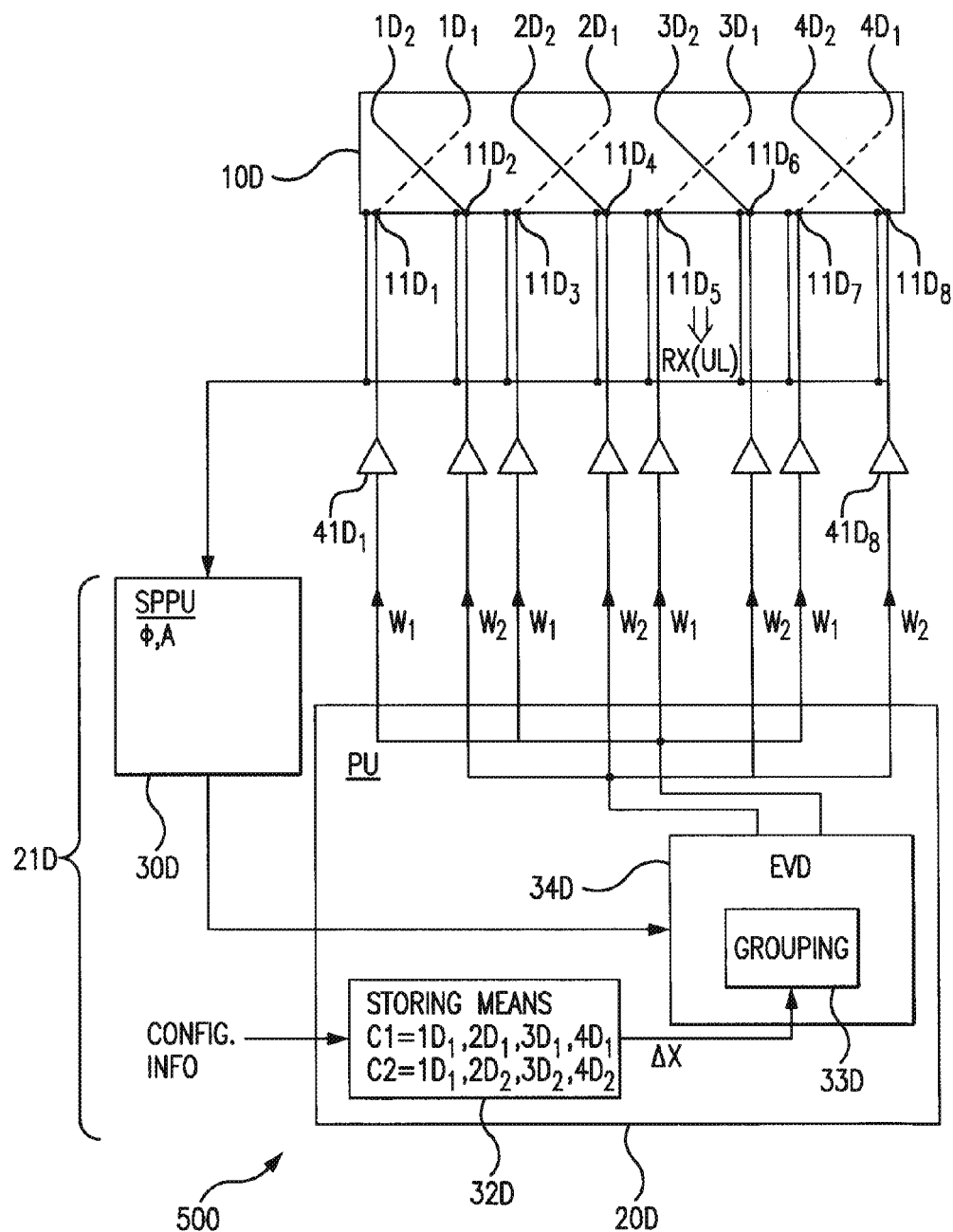
FIG. 7 shows a fifth embodiment with a configuration handling means receiving/holding fixed configuration information comprising a distinguishing characteristic.

In an alternative embodiment, c.f. FIG. 7, grouping can be done a priori based on configuration information that may be provided in other manners and does not need to be based on actual estimates of the correlation matrix. For single polarized antenna parts with a high correlation there will be one group only, whereas for a dual polarized antenna parts (antennas) there will be two groups, one per polarization since e.g. vertical and horizontal polarization components fade independently.

In FIG. 3 CI (SPPU 30) relates to correlation related information and $\Delta x$(CI) 22 indicates the establishment of distinguishing characteristics.

Figure 4:
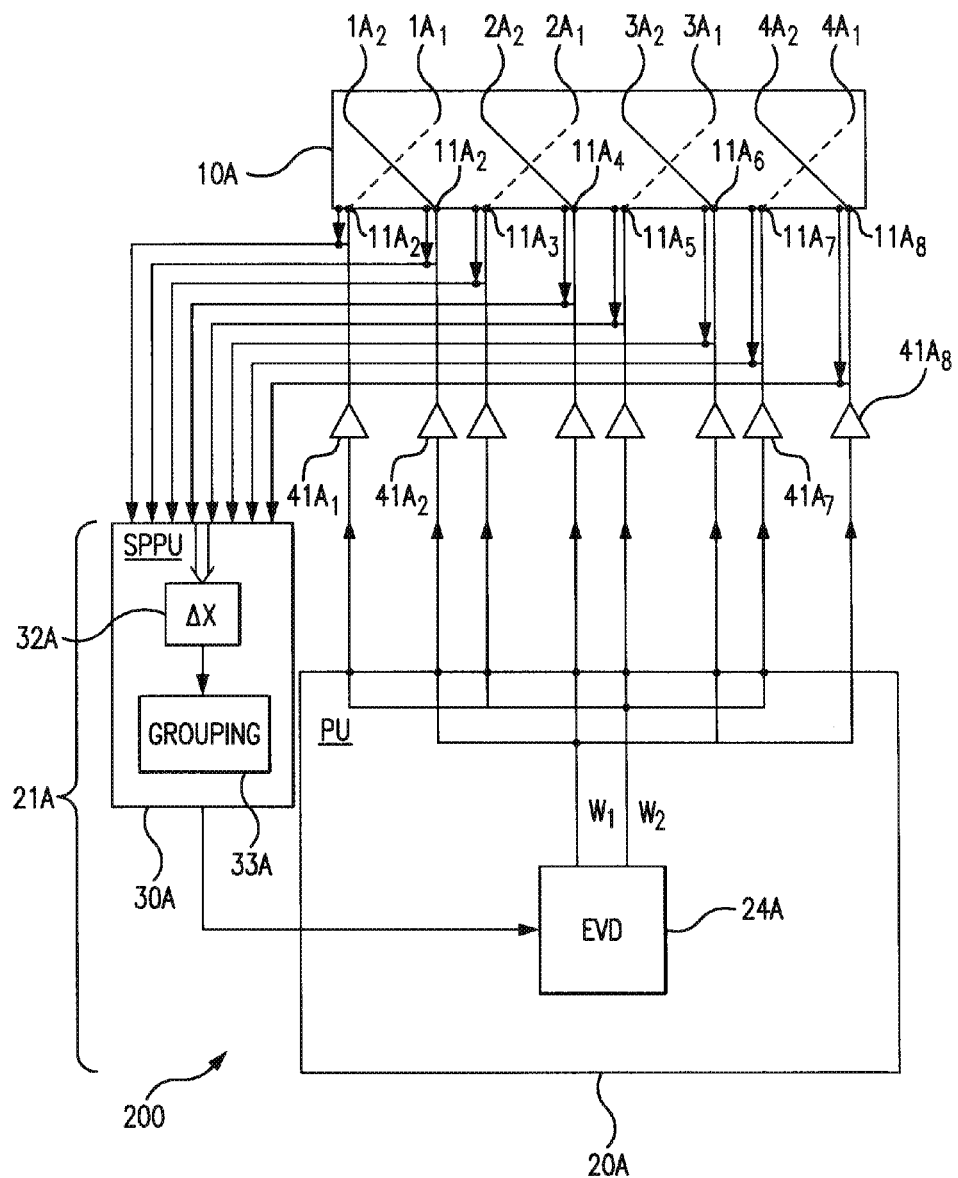
FIG. 4 shows a second embodiment of a base station arrangement according to the invention.

FIG. 4 shows a base station arrangement 200 connected to or comprising an antenna part 10A, with dual polarized antenna means, comprising a number of first antenna elements $1A_1, 2A_1, 3A_1, 4A_1$ of a first polarization and second antenna elements $1A_2, 2A_2, 3A_2, 4A_2$ of another, different, second polarization. For an UE, (not shown) which has a single polarized antenna wherein the polarization is given by the spatial orientation angle, in communication with an antenna having dual polarizations, the fading will be independent for vertical and horizontal polarization components. As in the embodiment discussed with reference to FIG. 3, by means of a signal pre-processing unit 30A collecting uplink correlation related information, by means of detecting means 32A, here in SPPU 30A, a distinguishing characteristic will be recognized, different correlating properties, due to different polarization, and, in grouping means 33A, the antenna elements will be grouped into two different groups. As in the preceding embodiment the base station processing unit comprises an eigenvalue decomposition means 24A arranged to, with magnitude normalization independently for each group, form a weight vector for each group (polarization). Weight vector $w_1$ is applied to second antenna elements $1A_2, 2A_2, 3A_2, 4A_2$ and weight vector $w_2$ is applied to first antenna elements $1A_1, \ldots, 4A_1$. The application of the respective transmit power is performed by means of amplifying means $41A_1, \ldots, 41A_8$.

Figure 5:
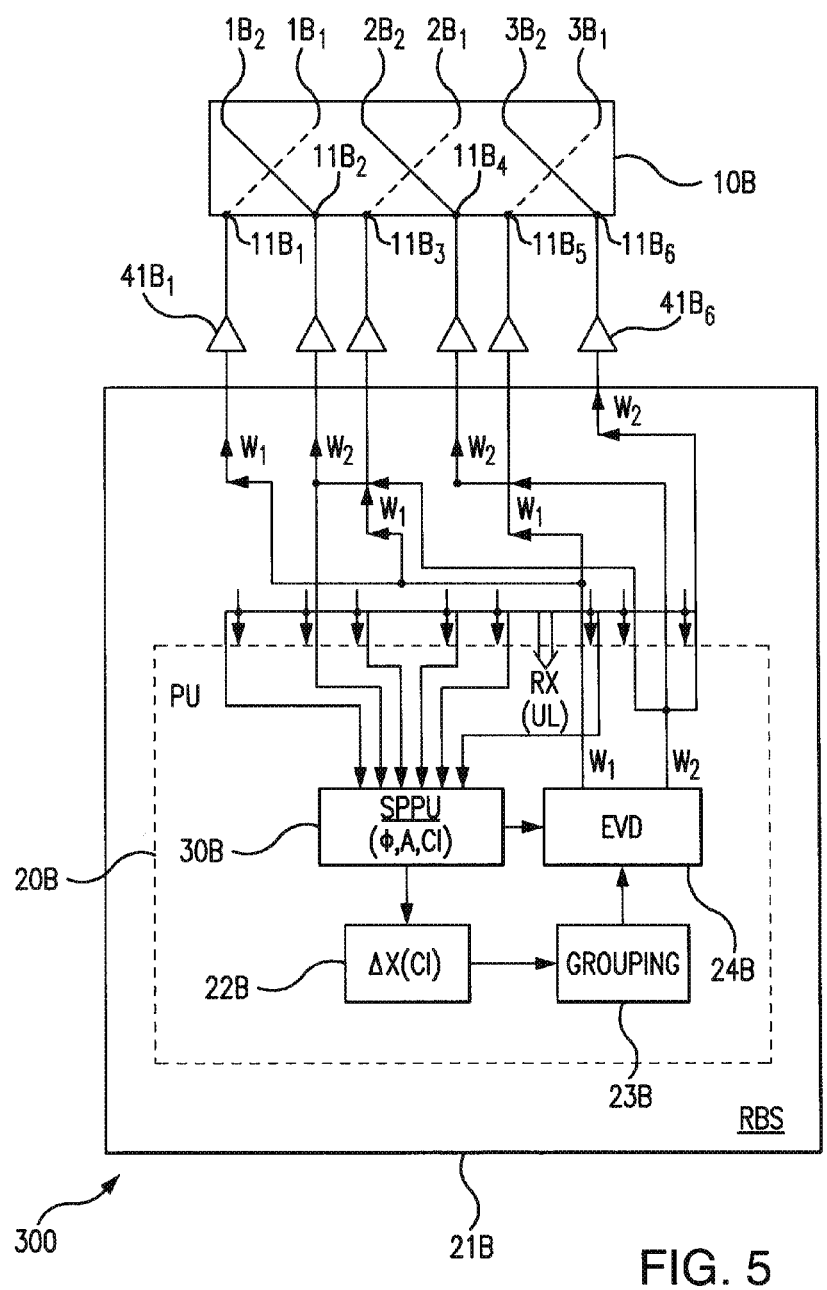
FIG. 5 shows a third embodiment with a signal pre-processing unit included in a processing unit of the base station arrangement.

FIG. 5 shows another embodiment of a base station arrangement 300 connected to or comprising an antenna part 10B comprising three first antenna elements $1B_1$, $2B_1$, $3B_1$ with a first polarization and three antenna elements $1B_2$, $2B_2$, $3B_2$ with another, different polarization and which are connected to antenna ports $11B_2, \ldots, 11B_6$. Here it is supposed that the signal pre-processing functionality is included in the processing unit 20B of the base station arrangement 21B. As in the preceding embodiments detecting means 22B, implemented as hardware and/or software, are provided for establishing distinguishing characteristic, which also in this case is different correlation properties (here caused by different polarizations). Grouping means 23B, which may be combined with the detecting means or implemented as separate hardware and software means, are adapted to group antenna elements correspondingly into two groups. An eigenvalue decomposition is performed to find eigenvectors for the respective groups in eigenvalue decomposition means 24B. The eigenvalue decomposition has to be based on all antenna elements, using the correlation information provided by SPPU 30B, and it also can be done before the grouping step. Finally the respective weight vectors $w_1$, $w_2$ are applied to the two antenna element groups.

Figure 6:
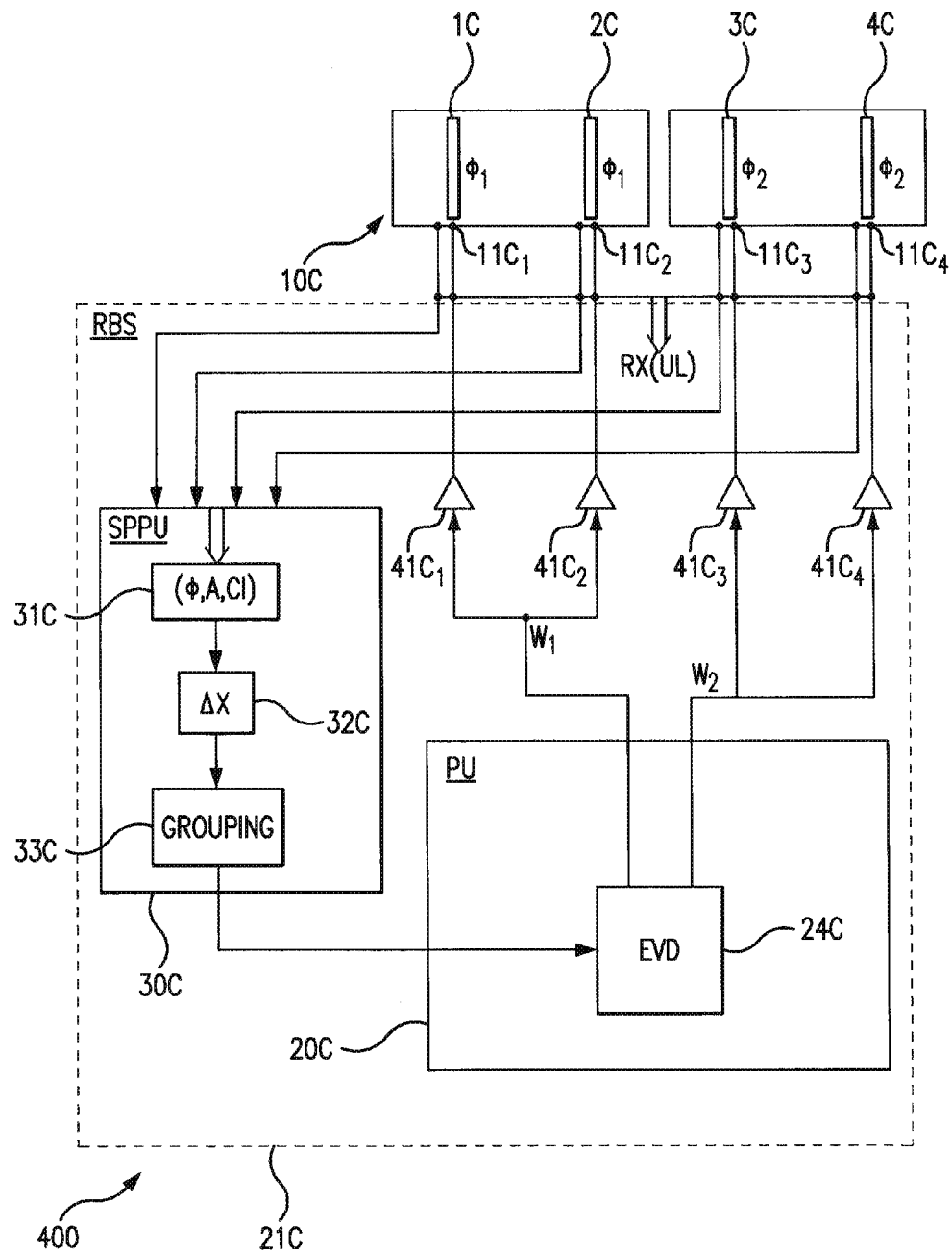
FIG. 6 shows a fourth embodiment, with single polarized antennas, the spatial power at antenna ports being the distinguishing characteristic.

FIG. 6 shows an embodiment with a single polarized antenna part 10C comprising, here, four antenna elements 1C, 2C, 3C, 4C arranged in two groups or on two separate antenna means, which may have different locations, directions etc. In one implementation the antenna means have different spatial directions, the spatial directions hence producing the distinguishing characteristic, (different correlation properties) or they are spatially separated hence forming the distinguishing characteristic in both examples such that channel correlation between the two groups of elements becomes low. The elements may also have arbitrary polarizations (not shown). Thus, as in the preceding cases, a signal pre-processing unit 30C comprising collecting means 31C collect correlation related information, and detecting means 32C are provided for detecting if correlation properties are different, if elements are uncorrelated. This information is used by grouping means 33C where the antenna elements are grouped into two different groups, in this case into different groups corresponding to antenna elements 1C and 2C and 3C and 4C respectively. In processing unit 20C an eigenvalue decomposition is performed in eigenvalue decomposition algorithm holding means 24C resulting in different eigenvectors to be applied to the two groups. Here $w_1$ is applied to antenna elements 1C, 2C whereas $w_2$ is applied to antenna elements 3C, 4C.

FIG. 7 shows a base station arrangement 500 connected to (or comprised in) an antenna part 10D. The base station arrangement comprises a processing unit 20D and a pre-processing unit 30D. The antenna part 10D comprises a plurality of first antenna elements $1D_1$, $2D_1$, $3D_1$, $4D_1$ of a first polarization and a plurality of second antenna elements $1D_2$, $2D_2$, $3D_2$, $4D_2$ of a second polarization. As in the preceding embodiments a signal pre-processing functional unit 30D is provided for collecting channel correlation information. Also in this case it is shown as forming a separate means or separate processor but it may as well be included in the processing unit 20D. The processing unit comprises means for performing an eigenvalue decomposition 34D which in this embodiment is done after grouping, which is done in the grouping means 33D using separately provided configuration related information. The configuration information is supposed to be fixed and stored and here the antenna elements $1D_1$, $2D_1$, $3D_1$, $4D_1$ are associated with a first distinguishing characteristic C1, whereas the antenna elements $1D_2$, $2D_2$, $3D_2$, $4D_2$, are associated with distinguishing characteristic C2, different from C1. It can also be seen as a characteristic for which the values are different. This information may be provided as configuration information by an operator in any appropriate manner or it may be held in the storing means 32D for a longer or a shorter time period, the storing means may for example comprise a cache or some other storing facility. Thus, here the grouping is done independently from the correlation information. The grouping may then also be done a priori and be held in the storing means 32D in FIG. 7. The distinguishing characteristic may be the polarization or the distance between relative positions of the antenna elements. As also discussed above the eigenvalue decomposition is done on all elements. Correlation information is used to provide the weight vectors.

Figure 8:
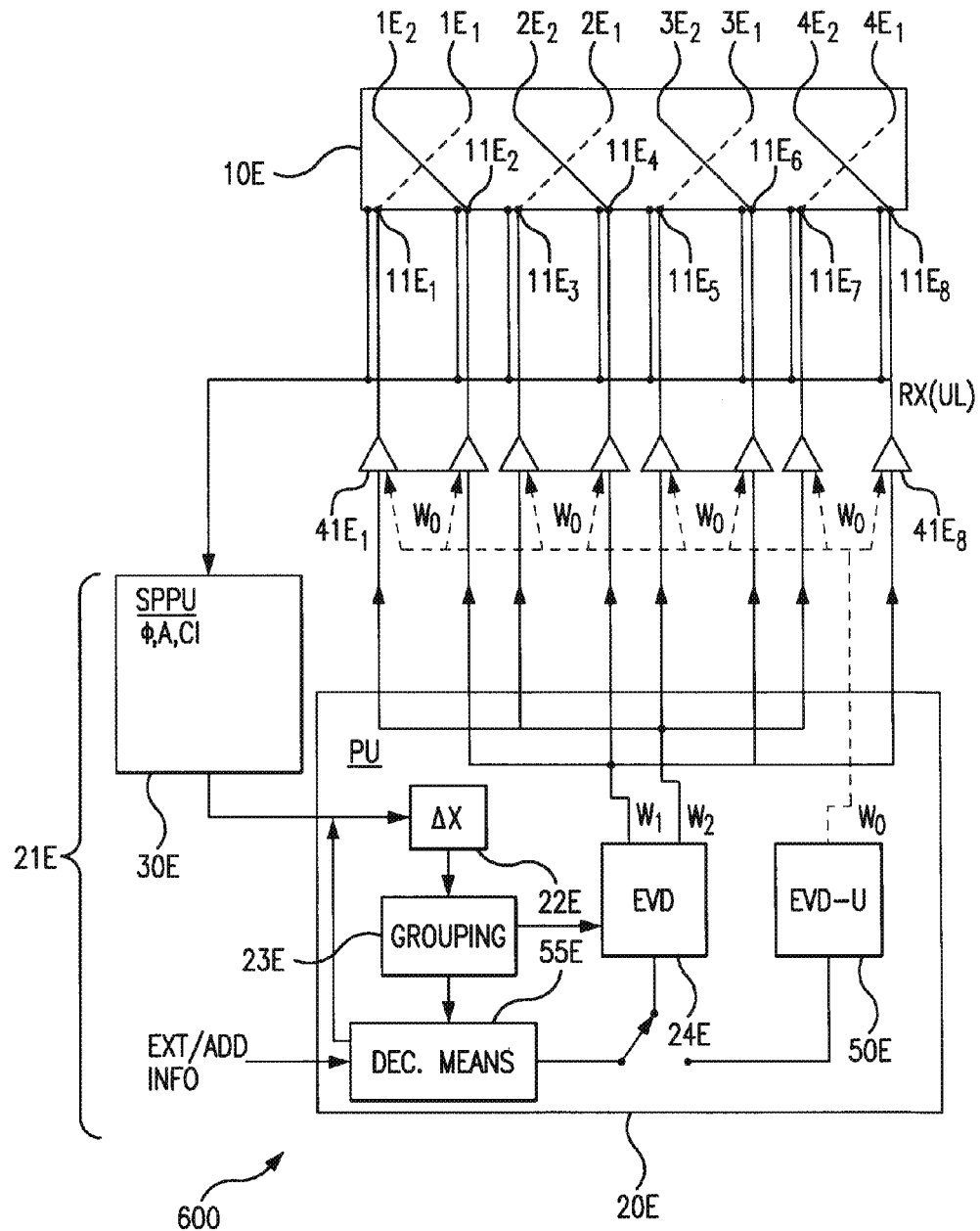
FIG. 8 shows a sixth embodiment with a base station arrangement operable in a mode as described above and in a conventional mode.

FIG. 8 shows a base station and antenna arrangement 600 according to still another implementation. Also in this case the antenna part 10E comprises dual polarized antenna means, each with a first antenna element $1E_1, \ldots, 4E_1$ with a first polarization and a second antenna element $1E_2, \ldots, 4E_2$ of another polarization. The antenna part also comprises a plurality of antenna ports, $11E_1, \ldots, 11E_8$. The base station arrangement comprises a signal pre-processing unit adapted to collect correlation related information and detecting means 22E for establishing if there are any groups of elements having low correlation between the groups. Here it can be established that the correlation is low between certain antenna elements. Based thereupon the antenna elements are arranged into different groups in grouping means 23E. It should be clear that also in this embodiment the grouping can be done before or after performing an eigenvalue decomposition. The signal pre-processing function unit in this embodiment also is connected to decision means 55E which may determine to switch over between connecting to means 50E for performing a conventional eigenvalue decomposition to find a single eigenvector to be used for transmission or to eigenvalue decomposition means 24E, according to the present invention, based on the grouping for individual power setting for different groups. Thus, if it is determined that some of antenna elements have a low correlation or are associated with different configuration properties, it can be switched to eigenvalue decomposition means 24E wherein, for each group, a respective vector, being subsets of the original eigenvector, is used. If there is no distinguishing characteristic (e.g. different correlation properties or different configuration properties) e.g. or if for some other reason, a conventional eigenvalue decomposition may or should be selected, a switch is done to the decomposition means 50E. The decision may be based on external information or additional information or any information as provided by correlation information etc. In one embodiment the decision is based on the numbers of streams or layers that are used for communication between UE and RBS. Individual or groupwise application of weight vectors is applicable for single layer transmission. Even if two layer transmission is supported, sometimes, still, one layer, or one stream, communication is only used and then groupwise transmission control, according to the inventive concept, can be used. If conventional eigenvalue decomposition is implemented, for all antenna elements, transmit power will be controlled by means of the same weight vector $w_0$.

Normally the number of antennas on the uplink and downlink are the same enabling direct application of the suggested group or individual based transmit power control.

The performance for a method as discussed above has been evaluated by means of a simple simulation of a base station and antenna arrangement comprising four dual polarized antenna means and a single polarized UE antenna where polarization is given by spatial orientation angle. Independent fading for vertical and horizontal polarization components is applied. Average channel power gain per polarization is a parameter and the UE has an antenna for which the polarization is given by its spatial angle wherein α=0° means that the antenna has a horizontal polarization whereas α=90° means that the antenna has a vertical polarization. First the performance for a static channel is considered. Let the channel be static and the gain per polarization components (vertical, horizontal) identical according to $$c = \begin{bmatrix} 1 \\ 1 \end{bmatrix},$$

and for such a case it is possible to easily study vector geometries in order to derive performance. It supposed that the antenna polarizations are V/H (vertical/horizontal). The electrical field magnitude at the radio base station antenna array, here a single dual polarized element (here called an antenna means with two different polarized elements), is found to be:

$$E_{RBS} = \begin{bmatrix} \sin\alpha \\ \cos\alpha \end{bmatrix}$$

This results in an eigenvector where the amplitude relation at the elements is given by tanα. If this is used in a traditional (reference) way as the transmit vector, after normalization such that the largest amplitude=1, the E-field components at the UE will be:

$$E_{UE,1} = \begin{bmatrix} \tan\alpha \\ 1 \end{bmatrix}$$

(it is assumed that 0<α<45 deg).
The power received by the UE antenna is then found to be:

$$P_{UE,1} = \left( [\sin\alpha\ \cos\alpha] \begin{bmatrix} \tan\alpha \\ 1 \end{bmatrix} \right)^2 = \frac{1}{\cos\alpha^2}$$

for 0<α<45 deg.
If instead the method according to the present invention, based on grouping, is used, the transmit vector will be normalized per group, in this case polarization element, resulting in an E-field at the UE given by:

$$E_{UE,2} = \begin{bmatrix} 1 \\ 1 \end{bmatrix}$$

The received power is then found to be:

$$P_{UE,2} = \left( [\sin\alpha\ \cos\alpha] \begin{bmatrix} 1 \\ 1 \end{bmatrix} \right)^2 = (\sin\alpha + \cos\alpha)^2$$

Figure 9:
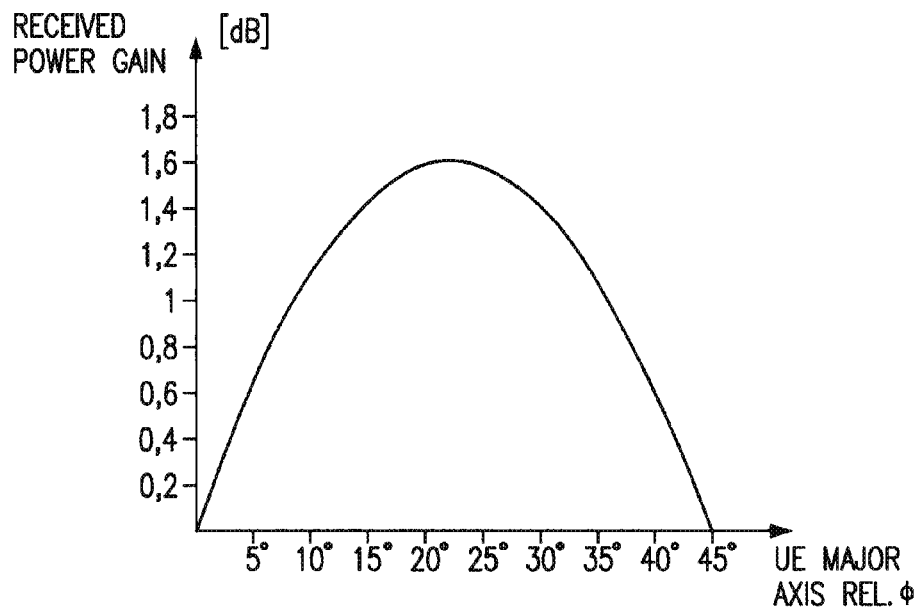
FIG. 9 is a diagram illustrating, for static channels, a comparison of gain in received power for an arrangement of the present invention and in a conventional arrangement.

FIG. 9 discloses the relation between the power received at the UE with the inventive method and the power received using the conventional method, $P_{UE,2}/P_{UE,1}$, is illustrated. It can be seen that a power which is considerably higher can be received at the UE through the use of the inventive concept.

As can also be seen there is no gain for UE antenna orientation angles around 0°. This is due to the fact that for these angles the UE antenna polarization is basically parallel to one of the polarizations in the base station (it should be noted that base station antenna polarization of 0°/90° was assumed) and the received power is not increased when transmitting in an orthogonal polarization. Similarly no gain is observed at 45° as the conventional method based on eigenvalue decomposition results in equal or full power for both polarization branches.

One effect of increasing the output power for an element with a low amplitude as given by the eigen value decomposition is that power in a polarization orthogonal to the UE antenna will occur. This power will not be received by the UE.

It should be noted that in a typical case, with fading channels, one can not distinguish between impacts on received signal power in the base station between UE antenna orientation and, instant or average (depending on how long averaging is done), channel gain. Thus the assumption of identical channel gain above is just an example.

Figure 10A:
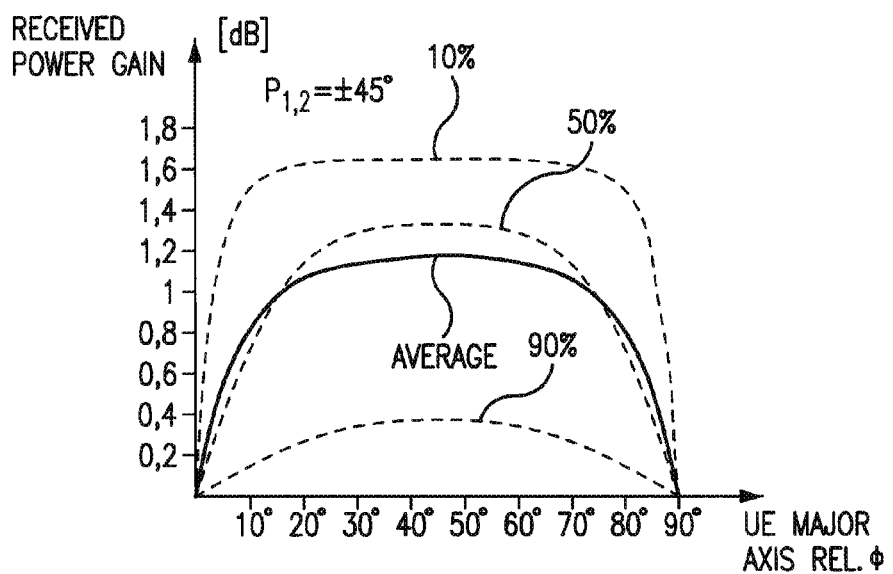
FIG. 10A shows gain, for fading channels, in received power in an UE compared to a conventional method for +/−45° polarized antenna elements.

Simulations have been performed also for fading channels for dual polarized radio base station antennas. Performance for fading channels are illustrated for a dual polarized antenna with +/−45° polarization in FIG. 10A and for a dual polarized antenna part with antennas having horizontal and vertical polarizations respectively in FIG. 10B.

Figure 10B:
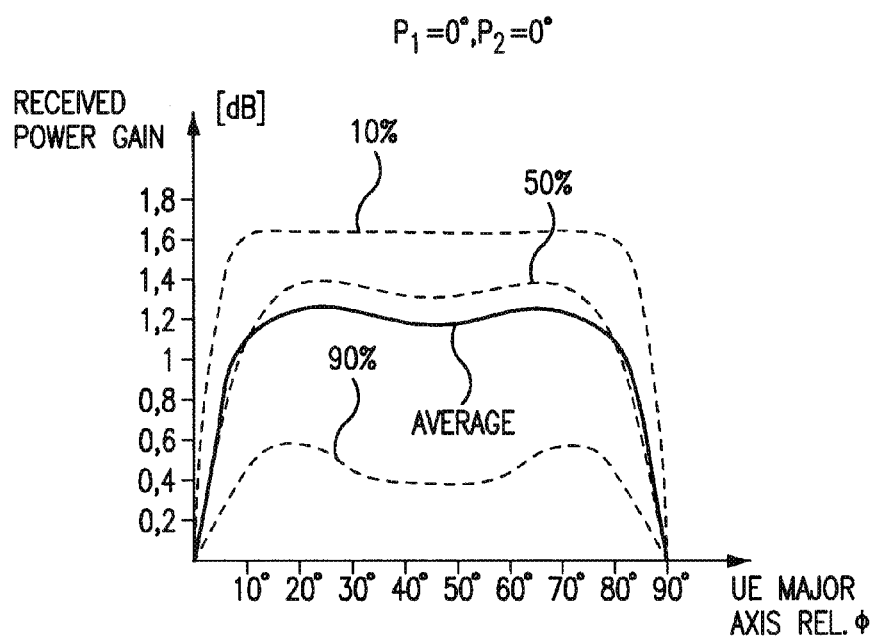
FIG. 10B shows gain, for fading channels, in received power in an UE compared to a conventional method for 0°/90° polarized antenna elements.

The channel has been modeled as being independent between realizations, snapshots, and also between vertical and horizontal components. FIG. 10A, 10B show the average power gain and 10, 50 and 90 percentile gains for received power relation of the method according to the present invention versus the state of the art method as discussed above, for +/−45° (FIG. 10A) and 0°/90° (FIG. 10B) for both channel polarizations having the same average power gain. As can be seen there is a substantial gain in received power in the UE. The gain depends on antenna orientation in the UE, the channel conditions as well as antenna configuration in the base station. In all cases there is a gain in the order of 1 dB for most UE antenna orientations.

Figure 11:
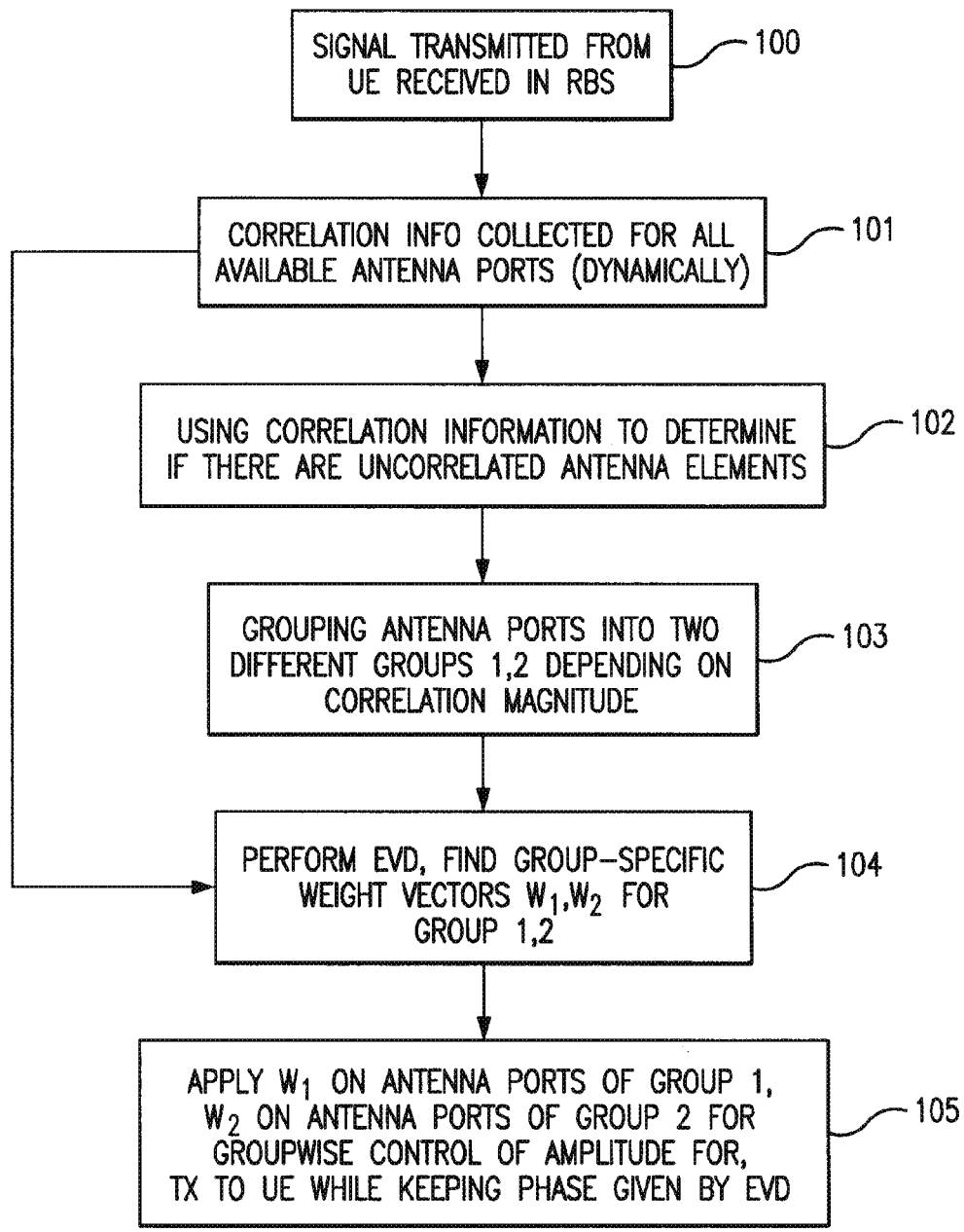
FIG. 11 is a flow diagram describing an implementation in which a distinguishing characteristic is extracted from dynamically provided correlation information.

The method according to the present invention according to one embodiment is explained with reference to the flow diagram in FIG. 11. A signal transmitted from a UE is received in a base station arrangement, 100. Channel correlation related information is collected for all available antenna ports, 101. Then a distinguishing characteristic e.g. low correlation between elements, is concluded using the channel correlation information. As referred to above a low correlation may result from different polarizations etc. The signals from antenna ports are grouped into, here, two different groups depending on the correlation properties; a high correlation between elements indicate that they should be grouped into the same group etc., 103. Then an eigenvalue decomposition is performed using correlation information, and group specific weight vectors $w_1$, $w_2$ are found, 104. The eigenvalue decompositions (EVD) have to be performed for all elements. Thus it becomes possible to adjust the amplitude differently for group 1 and 2 respectively but it is to be noted that the phases given by the EVD are kept, 104. Subsequently the w1 vector is applied to the antenna ports of group 1 and w2 to the antenna ports of group 2 for groupwise power control of the transmit power to the UE, 105.

Figure 12:
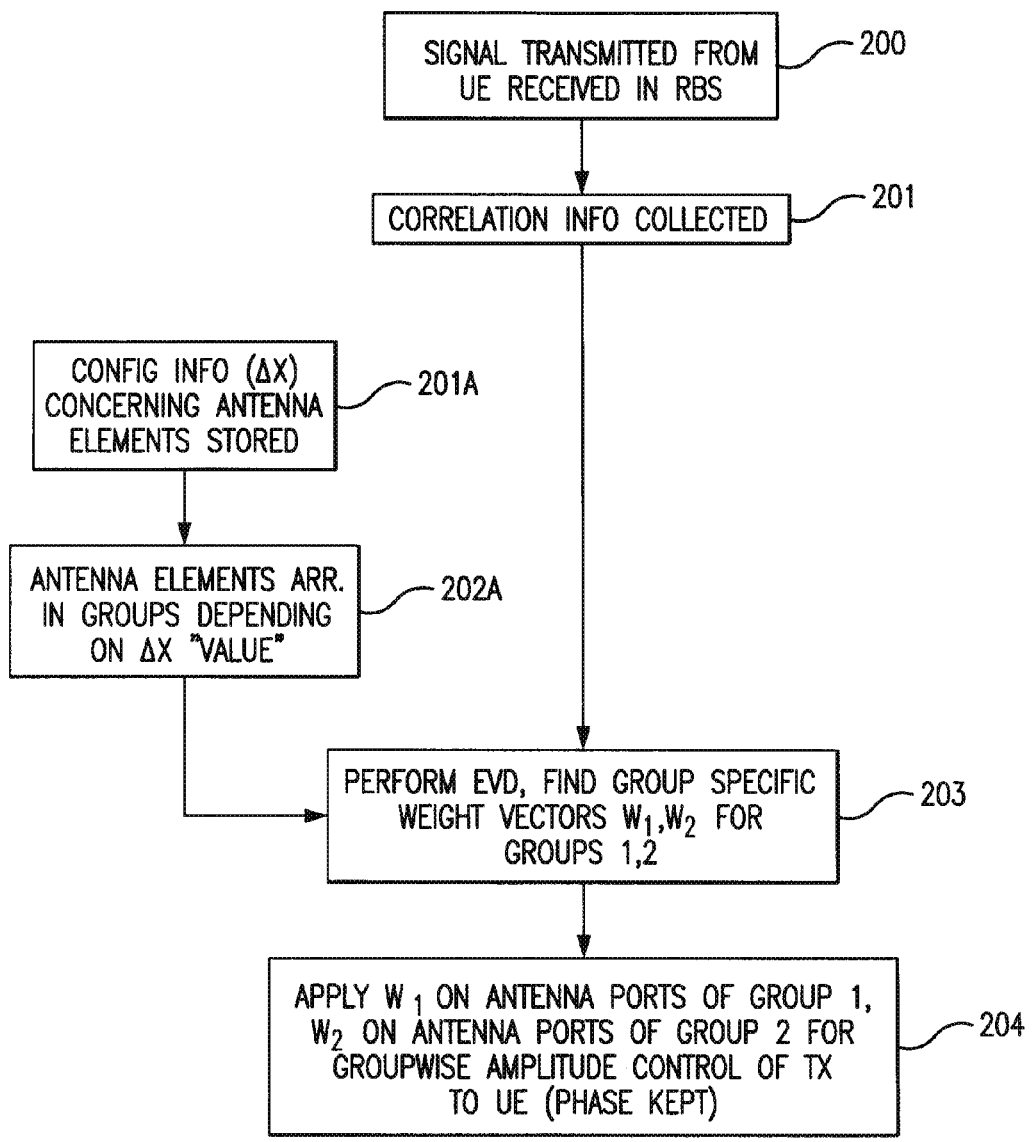
FIG. 12 is a flow diagram describing an implementation in which a distinguishing characteristic is provided statically to a configuration handling means.

FIG. 12 is a flow diagram schematically describing a procedure when configuration information, which for example is static, is provided separately. A signal transmitted from an UE is received in a base station arrangement, 200, and correlation related information is collected, 201. In storing means or via separately arranged input means (not shown) configuration information concerning antenna elements is provided to the radio base station 201, and antenna elements are grouped into groups depending on distinguishing characteristic, for example if the antenna elements have two different polarizations, or are located far from each other etc., 202A. The information needed for grouping may then be already available in the base station and fetched beforehand, or be fetched when an EVD has been performed on all antenna elements. Different group specific weight vectors $w_1$, $w_2$ are obtained, using correlation information, for groups 1, 2 (if there are two different groups), 203. The weight vector $w_1$ is then applied to antenna ports for antenna elements of group 1 and $w_2$ to the antenna ports of antenna elements of group 2 enabling control of the amplitude groupwise while keeping the phases as given by the EVD in step 203 above, 204.

Figure 13:
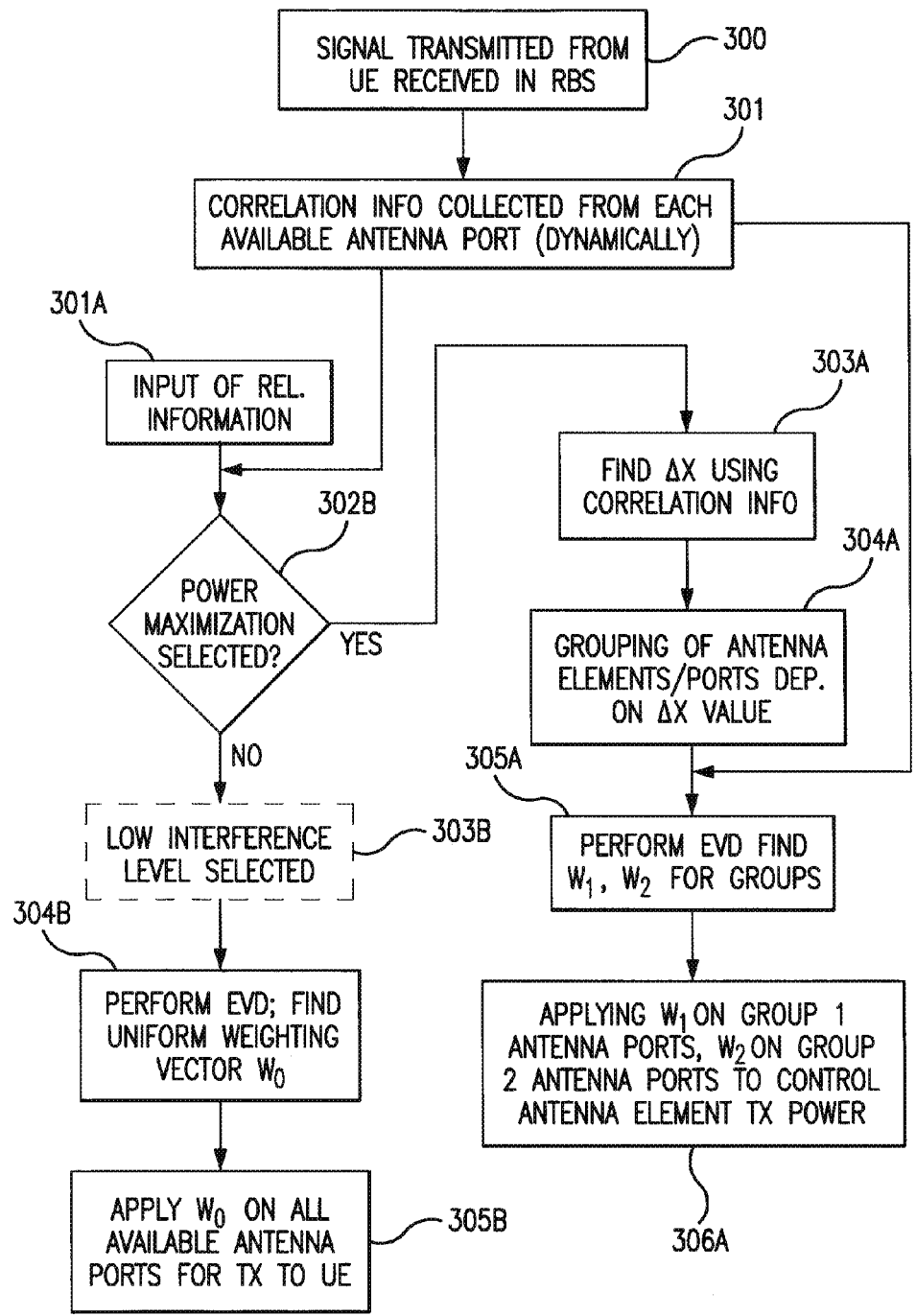
FIG. 13 shows an implementation with an arrangement operable in two modes.

FIG. 13 is a flow diagram describing an implementation enabling selection between the use of a conventional eigenvalue decomposition method and an eigenvalue decomposition for groupwise power, amplitude, control according to the present invention. It is supposed that a signal transmitted from an UE is received in a radio base station, 300. As described above correlation information is collected from each available antenna port, 301. Some relevant information is used to assist in the decision concerning use of conventional EVD decomposition or EVD for groupwise control. This information may comprise transmission related information, for example determination of the number of streams to be transmitted, bearing in mind that EVD for groupwise control according to the present invention is applicable for single layer transmission. This means that information may comprise information about if a MIMO (Multiple Input Multiple Output) communication system is used, or even if MIMO is implemented, if for example only one stream is used, which makes the inventive concept directly applicable, 301A. Also other information may be relevant for making the decision. Subsequently it is determined if power maximization (groupwise control) is selected, on condition that it is possible, 302B. If not, or if for example a low interference level is more important, 303B, or if there are two communication streams, a uniform, conventional EVD is performed and a single weight vector $w_0$ is found, 304B. The weight vector $w_0$ is then applied on all available antenna ports for transmission to the UE, 305B.

If on the other hand power maximization was selected or if it was determined to apply groupwise or individual transmission control, the correlation information is used to see if there are any distinguishing characteristics, 303A, between antenna elements (i.e. the channels associated therewith), and the antenna elements are grouped depending on the outcome of the examination, whereby antenna elements having a high correlation are grouped into one and the same group. Then an EVD is performed on all antenna elements as discussed above, weight vectors $w_1$, $w_2$ are found, 305A, and the amplitude is adjusted groupwise whereas the phases given by the EVD are kept by applying $w_1$ on group 1 antenna ports and $w_2$ on group 2 antenna ports to control antenna element transmit power, 306A.

It should be clear that it is not excluded that there are more than two groups in which case more weight vectors have to be found.

The invention can be varied in a number of ways without departing from the scope of the invention. Particularly it should be clear that instead of an eigenvalue decomposition of the channel correlation matrix, a single value decomposition of the channel itself could be performed. It should also be clear that the invention is not limited to e.g. four dual polarized antenna means, but there can be any number of single or dual polarized antenna means. Other kinds of polarizations are also possible, elliptical etc. In some embodiment already existing, hardware is used, whereas in other embodiments additional dedicated hardware is used to perform the respective functions.

The inventive concept is applicable to conventional systems as well as to active antennas, wherein the radio functionality is built into the antenna.

The invention claimed is:

1. A base station arrangement adapted to, over radio communication channels, receive signals from, and transmit signals to, a user station, and being adapted to be connected to, or comprises, an antenna part with a plurality of antenna elements with one antenna port for each antenna element, the base station arrangement comprising:
   a processing unit to which the antenna ports are connected;
   a number of power amplifying units;
   a signal pre-processing functional unit that is adapted to collect channel correlation information from signals received from the user station over the antenna ports; and
   a detector adapted to detect if there are one or more distinguishing characteristics associated with channels associated with the antenna elements, a distinguishing characteristic comprising one or more distinguishing correlation properties and/or distinguishing configuration related properties, wherein
   the processing unit or the signal pre-processing functional unit is adapted to assign antenna elements to different groups based on the detected distinguishing correlation properties and/or the detected distinguishing configuration properties,
   the processing unit is adapted to use the collected channel correlation information to generate weighting information and to apply said weighting information to antenna elements to control the antenna element transmit power for transmission to the user station, such that transmit power can be set independently for said different groups,
   the base station arrangement is further adapted to be connected to or comprise an antenna part wherein second antenna elements are associated with at least one characteristic which is different from a corresponding characteristic of a first antenna element, said at least one distinguishing characteristic being the polarization, the first antenna elements having a first polarization and the second antenna elements having a second polarization different from said first polarization, and that said first and second antenna elements are assigned to different groups depending on the existence of the or a distinguishing characteristic independently of which the distinguishing characteristic is.

2. The base station arrangement according to claim 1, wherein the base station arrangement is further adapted to be connected to or comprises an antenna part wherein the first and second antenna elements have a linear polarization, the first antenna elements having a linear vertical polarization and the second antenna elements having a linear horizontal polarization, or vice versa, or that the first and the second antenna elements have a circular polarization, the first antenna elements being left-hand polarized and the second antenna elements being right-hand polarized or vice versa;, or that the first and second antenna elements have non-parallel elliptical polarizations, or that the first and second antenna elements have a linear polarization which is +45° or −45° for a first antenna element and −45° or +45° for a second antenna element respectively, and that information about the different polarization states is provided separately, and is used for assigning elements to different groups, or the grouping is based on correlation properties.

3. The base station arrangement according to claim 1, wherein the signal pre-processing unit is adapted to extract radio channel phase and amplitude related information for each antenna element from signals received over each available antenna port, a further distinguishing characteristic being different comprises correlation properties which are different due to different spatial amplitudes and/or different phase distributions, and the processing unit or the signal pre-processing unit is adapted to perform the grouping of antenna elements based on said different correlation properties without information about what causes the different correlation properties.

4. The base station arrangement according to claim 1, wherein the processing unit is adapted to use the correlation information to form a channel correlation matrix comprising a number of matrix elements and to perform an eigenvalue decomposition for all elements giving the weighting information comprising weight vectors with elements belonging to different groups and to adjust the amplitude of the antenna elements of the different groups separately while keeping the phase as given by the eigenvalue decomposition.

5. The base station arrangement according to claim 1, wherein the signal pre-processing functional unit is adapted to be connected to the antenna ports and in that it is adapted to extract or collect the radio channel correlation information from the received signals.

6. The base station antenna arrangement according to claim 1, wherein the base station atennea arrangement comprises or is connected to a configuration handler, that the configuration handler is adapted to receive static configuration related information from external means, from an operator or from a manufacturer, and that the configuration unit or the detector of the pre-processing unit or the processing unit is adapted to use the static configuration information for grouping of the antenna elements.

7. The base station arrangement according to claim 1, wherein the signal pre-processing unit is arranged separately or is incorporated in the processing unit.

8. The base station arrangement according to claim 1, wherein the base station antenna arrangement comprises a second processing unit in addition to said processing unit, or an extended processing unit, and that it is operable in a first operational mode supporting groupwise power/amplitude control of antenna elements, and a second operational, conventional, mode, in which the processing unit is adapted to generate a single, common weight vector for all antenna elements, and the base station antenna arrangement further comprises a reconfiguration unit comprising a decision handler adapted to hold predetermined decision criteria and to, based on fulfilment of said criteria, select which of the first or second operational mode that is to be used.

9. The base station antenna arrangement according to claim 8, wherein the decision criteria are reconfigurable.

10. A method for, in an arrangement comprising a radio base station arrangement with a processing unit, controlling downlink transmission to a user station, comprising the step of:

receiving signals in the base station arrangement from the user station over an antenna part;

collecting or holding, from the signals received from the user station at a plurality of antenna ports of the antenna part, correlation related information concerning the radio channels associated with antenna elements from which the signals are received over available antenna ports;

using correlation related information or configuration related information to determine if there are antenna elements for which there are one or more distinguishing characteristics associated with the channels, comprising different correlation properties or different configuration properties, if yes; assigning such antenna elements to different groups;

generating, in the processing unit, using the correlation information, group related weighting information, for groupwise or individual power feeding of antenna elements associated with uncorrelated channels and/or channels having different configuration properties;

applying the group related weighting information to the antenna ports of the antenna elements of the respective groups via amplifying means while setting transmit power independently for the groups; and grouping, in the signal pre-processing unit or in the processing unit, the antenna elements depending on a first unknown or known distinguishing characteristic comprising different correlation properties or different configuration properties, wherein the first characteristic producing channels with different correlation properties, or uncorrelated channels, is the polarization in a global coordinate system which is common for all the antenna elements.

11. The method according to claim 10, wherein a further, second, distinguishing characteristic, which is detected as different correlation properties, is produced by different spatial amplitudes or phase distributions.

12. The method according to claim 10, wherein the collecting step comprises extracting the correlation information dynamically from the received signals in the signal pre-processing unit or in the processing unit.

13. The method according to claim 10, wherein
the collecting step comprises:
receiving from external means or holding, in configuration handling means, static configuration information concerning antenna elements; and
grouping the antenna elements having different configuration properties into different groups.

14. The method according to claim 10, further comprising:
performing an eigenvalue decomposition of a channel correlation matrix formed by the correlation information for each group; and
applying different weighting information comprising group specific weight vectors by applying the group specific weight vectors to the different groups, such that the transmit power applied to antenna elements of a group is independent from the transmit power applied to another group, while keeping the phase as given by the eigenvalue decomposition.

15. The method according to claim 10, further comprising:
estimating antenna and/or channel conditions for communication with the user station;
using one or more predetermined criteria to determine whether operation in a first mode applying group or individual antenna element power feeding is to be applied; otherwise; and
switching to a second mode in which uniform antenna element power feeding is implemented.

* * * * *

UNITED STATES PATENT AND TRADEMARK OFFICE
CERTIFICATE OF CORRECTION

PATENT NO. : 8,934,942 B2  
APPLICATION NO. : 13/376437  
DATED : January 13, 2015  
INVENTOR(S) : Petersson et al.

Page 1 of 1

It is certified that error appears in the above-identified patent and that said Letters Patent is hereby corrected as shown below:

In the specification

In Column 2, Lines 16-17, delete "$a(\phi)=[e^{j(-(N-1)/2kd\,\sin(\phi))}\,e^{j(-(N-3)/2kd\,\sin(\phi))}\,\ldots\,e^{j((N-1)/2kd\,\sin(\phi))}]^T$" and insert -- $a(\phi)=[e^{j(-(N-1)/2kd\,\sin(\phi))}\,e^{j(-(N-3)/2kd\,\sin(\phi))}\,\ldots\,e^{j((N-1)/2kd\,\sin(\phi))}]^T$ --, therefor.

In Column 2, Line 25, delete "$=cc^H a(\phi)a(\phi)^H + R_{nn}$" and insert -- $=cc^H a(\phi)a(\phi)^H + R_{n,n}$ --, therefor.

Signed and Sealed this  
Seventeenth Day of November, 2015

Michelle K. Lee  
*Director of the United States Patent and Trademark Office*